United States Patent
Diukman

(10) Patent No.: US 8,406,285 B1
(45) Date of Patent: Mar. 26, 2013

(54) TUNING ALGORITHM FOR FEED FORWARD EQUALIZER IN A SERIAL DATA CHANNEL WITH DECISION FEEDBACK EQUALIZER

(75) Inventor: Iddo Diukman, Haifa (IL)

(73) Assignee: Marvell Israel (MISL) Ltd., Yonkneam (IL)

( * ) Notice: Subject to any disclaimer, the term of this patent is extended or adjusted under 35 U.S.C. 154(b) by 822 days.

(21) Appl. No.: 12/551,939

(22) Filed: Sep. 1, 2009

Related U.S. Application Data

(60) Provisional application No. 61/094,179, filed on Sep. 4, 2008.

(51) Int. Cl.
*H03H 7/30* (2006.01)
*H03H 7/40* (2006.01)
*H03K 5/159* (2006.01)
(52) U.S. Cl. .......................................... 375/233
(58) Field of Classification Search .................... 375/233
See application file for complete search history.

(56) References Cited

U.S. PATENT DOCUMENTS

2008/0187082 A1 * 8/2008 Bhoja et al. ............... 375/371
2009/0304054 A1 * 12/2009 Tonietto et al. ........... 375/221

* cited by examiner

*Primary Examiner* — David C. Payne
*Assistant Examiner* — Tanmay Shah

(57) ABSTRACT

Embodiments of the present disclosure provide a method for tuning an analog equalizer and a digital equalizer associated with a communications channel. A plurality of signals is injected into a model of a communication channel, the model being configured to have an analog equalizer at a receiving end, tuning a setting of the analog equalizer to obtain a first ratio of a pulse peak to a rise time in a precursor portion of the injected plurality signals that are received from the channel, injecting another plurality of signals into the model of the communication channel, the model being reconfigured to have the tuned analog equalizer and a digital equalizer downstream of the tuned analog equalizer, and tuning a setting of the digital equalizer based on a post-cursor tail characteristic of the another plurality of signals. Other embodiments are also described and claimed.

14 Claims, 3 Drawing Sheets

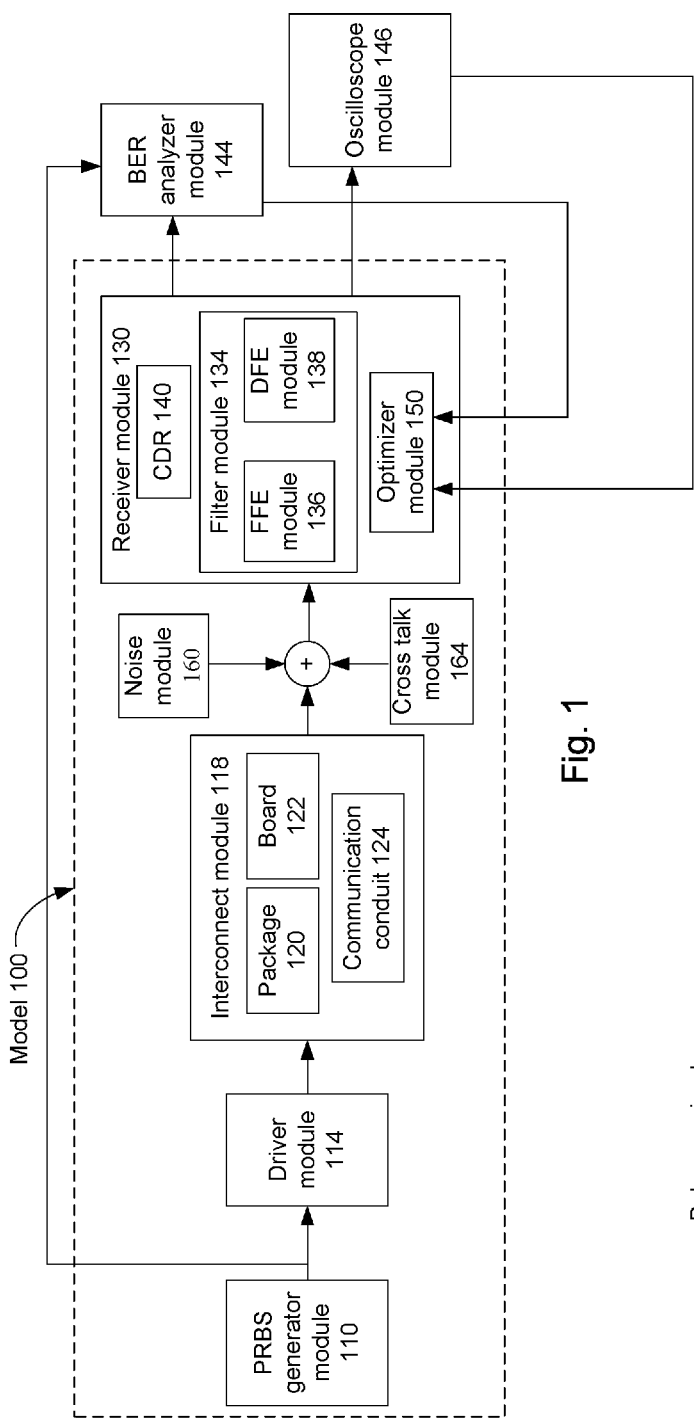
Fig. 1
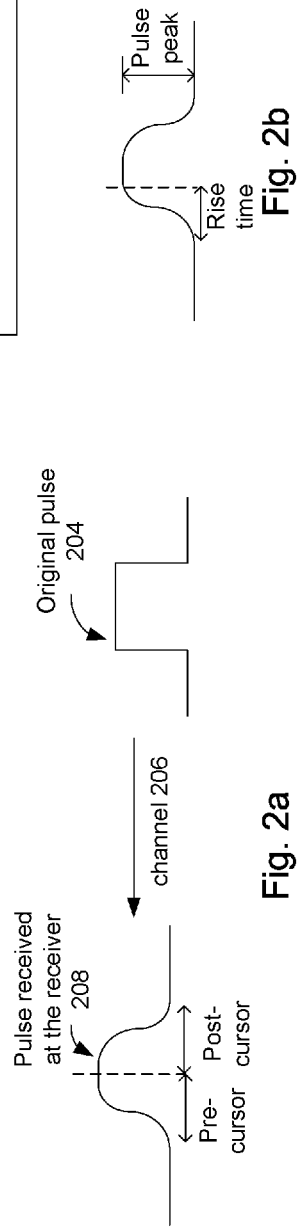
Fig. 2a
Fig. 2b

TUNING ALGORITHM FOR FEED FORWARD EQUALIZER IN A SERIAL DATA CHANNEL WITH DECISION FEEDBACK EQUALIZER

CROSS REFERENCE TO RELATED APPLICATIONS

The present application claims priority to U.S. Provisional Patent Application No. 61/094,179 filed Sep. 4, 2008, entitled "Optimization Algorithm for Feed Forward Equalizer in a Serial Data Channel with Decision Feedback Equalizer," the entire specification of which is hereby incorporated by reference in its entirety for all purposes, except for those sections, if any, that are inconsistent with this specification.

TECHNICAL FIELD

Embodiments of the present disclosure relate to feed forward equalizers (FFE), and more particularly, to tuning an FFE that is in a serial data channel with a decision feedback equalizer (DFE).

BACKGROUND

Signal propagation characteristics over a transmission channel are typically non-uniform throughout the electromagnetic spectrum. Different equalizers, including for example one or more of a decision feedback equalizer (DFE) and a feed forward equalizer (FFE), each filtering signals in a different manner, may be used at the receiving end of a transmission channel to compensate for signal loss and to reduce interference among signals defining digitally transmitted symbols. Typically the different equalizers are used in series and are each tuned independently, so that one or more of the equalizers achieve a generally flat response, for example by adjusting tap weights, in an effort to optimize received signal integrity.

SUMMARY

In an embodiment, the present disclosure provides a method for tuning an analog equalizer and a digital equalizer, comprising injecting a plurality of signals into a model of a communication channel, the model being configured to have an analog equalizer at a receiving end, tuning a setting of the analog equalizer to obtain a first ratio of a pulse peak to a rise time in a precursor portion of the injected plurality signals that are received from the channel, injecting another plurality of signals into the model of the communication channel, the model being reconfigured to have the tuned analog equalizer and a digital equalizer downstream of the tuned analog equalizer, and tuning a setting of the digital equalizer based on a post-cursor tail characteristic of the another plurality of signals.

In an embodiment, tuning a setting of the analog equalizer comprises tuning the first ratio of the pulse peak to the rise time to an optimal ratio of the pulse peak to the rise time in the precursor portion of the injected plurality signals that are received from the channel. In an embodiment, tuning a setting of the analog equalizer comprises tuning the first ratio of the pulse peak to the rise time to a maximum achievable ratio of the pulse peak to the rise time in the precursor portion of the injected plurality signals that are received from the channel. In an embodiment, tuning a setting of the analog equalizer comprises tuning the first ratio of the pulse peak to the rise time to a maximum achievable slope of rising edge of the precursor portion of the injected plurality signals that are received from the channel.

The method may further comprise injecting a further another plurality of signals into the model having the tuned analog equalizer and the tuned digital equalizer, and measuring a bit error rate (BER) of the model based at least in part on injecting the further another plurality of signals. In an embodiment, the method may further comprise determining that the measured BER is less than a threshold BER value, and iteratively repeating injecting a plurality of signals, subsequent tuning of the setting of the analog equalizer, injecting another plurality of signals, subsequent tuning of the setting of the digital equalizer, injecting a further another plurality of signals, and subsequent measurement of the BER, until the measured BER of the model is less than the threshold value, wherein a ratio of the pulse peak to the rise time during each iteration is less than a ratio of the pulse peak to the rise time of the immediate previous iteration. In an embodiment, the method may further comprise determining a final setting of the analog equalizer and the digital equalizer of the model at the end of said iteratively repeating, and tuning an analog equalizer and a digital equalizer of the communication channel using the final settings. In an embodiment, the analog filter is a feed forward equalizer and the digital filter is a decision feedback equalizer.

There is also disclosed, in an embodiment, a system comprising a model representative of a communication channel, the model comprising a driver module configured to receive a pseudo-random binary sequence of data during a simulation of the model, an interconnect module configured to transmit the received pseudo-random binary sequence of data to a receiver module during the simulation, the receiver module including an analog equalizer module, a digital equalizer module, and an optimizer module configured to tune the analog equalizer module and the digital equalizer module, and a bit error rate (BER) analyzer module operatively coupled to the receiver module and configured to determine a BER of the model.

There is also disclosed, in an embodiment, a machine-readable medium having associated instructions, which, when executed, instructs a machine to inject a plurality of signals into a model of a communication channel, the model being configured to have a feed forward equalizer (FFE) module at a receiving end, tune a setting of the FFE module to obtain a first ratio of a pulse peak to a rise time in a precursor portion of the injected plurality signals that are received from the channel, inject another plurality of signals into the model of the communication channel, the model being reconfigured to have the tuned FFE module and a decision feedback equalizer (DFE) module downstream of the tuned FFE module, and tune a setting of the DFE module based on a post-cursor tail characteristic of the another plurality of signals.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

FIG. 1 schematically illustrates a model representative of a communication channel, in accordance with an embodiment of the present disclosure;

FIG. 2a illustrates shapes of an example pulse at a transmitting end and a receiving end of a communication channel;

FIG. 2b illustrates shape of another example pulse at a receiving end of a communication channel;

DETAILED DESCRIPTION

Figure 3:
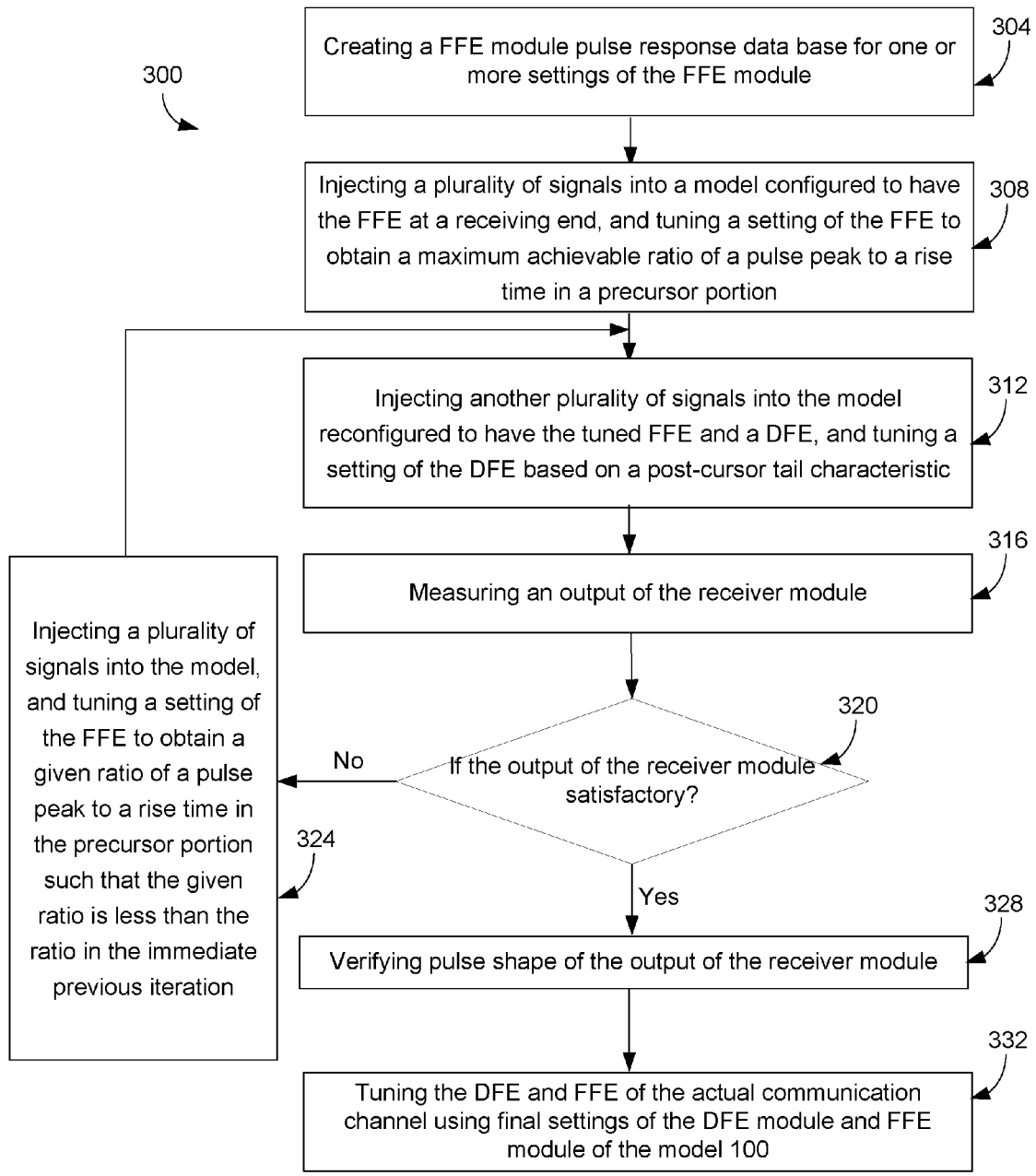
FIG. 3 illustrates a method for tuning an FFE module and a DFE module of FIG. 1, in accordance with embodiments of the present disclosure.

FIG. 1 schematically illustrates a model 100 representative of a communication channel, in accordance with an embodiment of the present disclosure. The model 100 may be developed, for example, during a design, testing, development, and/or operational phase of the communication channel. In an embodiment, the model 100 may be developed using one or more suitable design or simulator software, e.g., Matlab® and Simulink® available from The MathWorks Corporation, SPICE (Simulation Program with Integrated Circuit Emphasis), and/or the like.

In accordance with an embodiment, the model 100 includes a pseudorandom binary sequence (PRBS) generator module 110 that is configured to generate a pseudorandom sequence of binary bits during a simulation of the model 100. When the actual communication channel is in operation, a suitable data source (e.g., a user speaking in a cellular phone, network data transferred through a switch, and the like) generates a data sequence. In the model 100 of the communication channel, the PRBS generator module 110 is configured to simulate or model such a data source.

The model 100 also includes a driver module 114 that is modeled to simulate a driver and/or a transmitter of the actual communication channel (i.e., the communication channel that is represented by model 100). The driver module 114 is modeled, for example, in Matlab® using a behavioral 1-tap pre-emphasis model of a driver and/or transmitter of the actual communication channel.

The model 100 also includes an interconnect module 118. The interconnect module 118 models an interconnect of the actual communication channel, interconnecting the transmitter and a receiver of the channel. In an embodiment, the interconnect module 118 is configured to model a wireless and/or wired interconnect. An interconnect of the actual communication channel may include various parts, e.g., board, packaging, a wired or wireless communication conduit, etc. Accordingly, in the model 100, the interconnect module 118 includes, for example, a package module 120, a board module 122, a communication conduit module 124, and/or the like. The package module 120 and the board module 122 includes, for example, estimated scattering parameters (S-parameter) and/or other parameters of the package and the board, respectively, of the interconnect of the actual communication channel. For example, the package module 120 and the board module 122 includes estimated capacitance of the die and/or packaging at the transmitting and/or receiving end of the interconnect of the actual communication channel. In an embodiment, one or more of these parameters used in the interconnect module 118 is measured using a network analyzer in an existing interconnect, and/or extracted from the layout using an appropriate 3-dimensional extraction tool such as HFSS®, PowerSI®, and/or the like.

The model 100 also includes a receiver module 130 that is modeled to simulate a receiver of the actual communication channel. The receiver module 130 includes models of various components of the receiver of the actual communication channel, including, for example, a filter module 134 (which models one or more filters of the actual communication channel), a clock data recovery (CDR) module 140 (which models a CDR of the actual communication channel), etc. In an embodiment, the receiver module 130 also includes an optimizer module 150 that is used to tune various filters in the filter module.

In accordance with an embodiment of the disclosure, the filter module 134 includes, for example, a feed-forward equalizer (FFE) module 136 (which models an FFE, which is an analog filter, in the actual communication channel) and/or a decision feedback equalizer (DFE) module 138 (which models a DFE, which is a digital filter, in the actual communication channel). Other suitable analog and digital filters may be modeled instead of, or in addition to, the FFE and DFE, respectively. In an embodiment, the DEF module 138 is positioned downstream of the FFE module 136. That is, the FFE module 136 processes data received by the receiver module 130, and the DEF module 138 processes data output by the FFE module 136. In an embodiment, the FFE module 136 and/or the DFE module 138 includes one or more adjustable settings (e.g., tap weights) that may be adjusted while tuning the respective module.

In an embodiment, at least a part of the receiver module 130 (e.g., the DFE module 138 and/or the CDR module 140) is modeled in Matlab® using, for example, a behavioral algorithmic model. In an embodiment, at least a part of the FFE module 136 is constructed, for example, by extracting frequency domain FFE curves by running an AC sweep spice simulation on an FFE cell spice netlist model.

It is noted that a more detailed description of modeling and/or generation of the PRBS generator module 110, driver module 114, interconnect module 118 and/or the receiver module 130 are not provided herein so as to avoid obfuscating the teaching principles of this detailed description.

In an embodiment of the disclosure, the model 100 also includes a noise injection module 160 and a cross talk module 164. In an embodiment, the noise injection module 160 and/or the cross talk module 164 is configured to inject noise and/or cross talk in the model 100 during a simulation of the model 100, to simulate noise and/or cross talk that the actual communication channel may experience during, for example, a regular or general operation of the channel. The noise injection module 160 and the cross talk module 164 are illustrated to inject noise and cross talk in the model 100 between the interconnect module 118 and the receiver module 130. However, although not illustrated, in an embodiment, the noise injection module 160 and/or the cross talk module 164 inject noise and/or cross talk in one or more other parts of the model 100 (e.g., in the communication conduit module 124, the PRBS generator module 110, the driver module 114, the receiver module 130, and/or between any two modules of the model 100). In an embodiment, one or more parts of the module 100 in which noise and/or cross talk are injected are based at least in part on one or more noise and/or cross talk sources in the actual communication channel.

In an embodiment, the model 100 (e.g., the receiver module 130) is operatively coupled to a bit error rate (BER) analyzer module 144 and/or an oscilloscope module 146, and a tuner module 150.

In an embodiment, while simulating an operation of the model 100, the BER analyzer module 144 analyzes and determines a BER of the model 100. For example, while simulating an operation of the model 100, the PRBS generator module 110 generates a sequence of pseudorandom binary bits (e.g., a pseudorandom data stream). Various components (e.g., the driver module 114, interconnect module 118, and the receiver module 130) of the model 100 processes the data stream, and the BER analyzer module 144 receives the data stream from the output of the receiver module 130. The BER analyzer module 144 also receives the data stream transmitted by the PRBS generator module 110 to the driver module 114. The BER analyzer module 144 compares the two received data streams, and based on the comparison, determines a BER of the output of the receiver module 130. For example, the BER analyzer module 144 determines a number of bits that have errors (by comparing the bits received from the receiver module 130 and the bits received directly from the PRBS generator 110), and calculates the BER by determining a ratio of the number of bits that have errors and the total number of bits transmitted.

In an embodiment, while simulating an operation of the model 100, the oscilloscope module 146 analyzes a pulse shape output by the receiver module 130. For example, the oscilloscope module 146 may be used to generate an eye diagram of the output of the receiver module 130, and measure one or more signal parameters (e.g., BER, eye opening, and/or the like) from the eye diagram.

The optimizer module 150 receives the determined BER from the BER analyzer module 144 and/or the determined pulse shape from the oscilloscope module 146, and is configured to tune the FFE module 136 and/or the DFE module 138 based at least in part on the received information.

In an embodiment, the model 100 may include only one of the BER analyzer module 144 and/or the oscilloscope module 146. Although illustrated as not being a part of the model 100, in an embodiment, the BER analyzer module 144, oscilloscope module 146, and/or the tuner module 150 may be part of the model 100. In an embodiment, a BER analyzer, an oscilloscope and/or a tuner may not be present in the actual communication channel that is represented by the model 100. Similarly, optimizer module 150 may be responsive to user supplied inputs.

In an embodiment, it may be possible to predict or estimate an operating condition of the actual communication channel during, for example, a general, typical or regular operation of the channel. For example, it may be possible to configure the driver module 114, the interconnect module 118, noise module 160, the cross talk module 164 and/or the receiver module 130 such that these modules mimic the behavior of the respective components during a general or typical operation of the actual communication channel. For example, during a general operation, the communication channel experiences a random noise, which may be, for example, additive white Gaussian noise (AWGN) with a known standard deviation σ. Accordingly, in the model 100, the noise module 160 may be configured to inject a Gaussian noise with a standard deviation of about G in the model 100 during a simulation of the model 100.

FIG. 2a illustrates shape of a pulse at a transmitting end and a receiving end of a communication channel 206. The pulse is assumed to be transmitted over any appropriate communication channel 206, for example, the communication channel model 100 (e.g., the interconnect module 118) of FIG. 1 and/or the actual communication channel that the model 100 represents. In an embodiment, the pulse, at the transmitting end, is a square wave pulse 204 representing a bit 1. However, due to noise, cross talk interference (e.g., inter symbol interference or ISI) and/or other affects of channel 206, the pulse 208 received at the receiving end (e.g., receiver module 130) of the channel 206 may have a shape that is different from a square wave pulse. It is noted that the received pulse 208 includes a pre-cursor portion (e.g., associated with a leading or raising edge of the pulse) and a post-cursor portion (e.g., associated with a trailing or falling edge of the pulse). A rise time of the pulse 208 may be defined as the time taken for a pulse to reach its peak value from its minimum value, as illustrated in FIG. 2b. For example, a square wave pulse (e.g., pulse 204 of FIG. 2a) has very small rise time, whereas the rise time of the pulse 208 is relatively larger because of, for example, ISI from one or more previous pulses.

As previously alluded, a conventional FFE is an analog high pass filter and is typically tuned to compensate for the effect of both the pre-cursor and post-cursor portion of received pulses, whereas a conventional DFE is a digital filter that typically is tuned to compensate for at least the post-cursor effects of the pulses. Individually tuning of the FFE and/or the DFE is not described in detail so as to avoid obfuscating key teaching points of this written description.

However, in an embodiment, the FFE module 136 of FIG. 1 is tuned to compensate for the effect of the pre-cursor portion of pulses received in the receiver module 130, without regard to affects on the post-cursor portion of the pules; the DFE module 138 of FIG. 1 is tuned to compensate for the effect of the post-cursor portion of the pulses received in the receiver module 130.

For example, the FFE module 136 is tuned to achieve a relatively smaller rise time of pulses received in the receiver module 130, by reducing a ratio of pulse peak to pulse rise time of the pulses. However, any processing of the pre-cursor portion of pulses by the FFE module 136 also affects the post-cursor portion of the pulses, which is compensated by appropriately tuning the DFE module 138. In an embodiment, the tuning of the FFE module 136 and/or the DFE module 138 is performed repeatedly (e.g., iteratively) until the receiver module 130 performs satisfactorily. A satisfactory performance is determined using, for example, the BER analyzer module 144 and/or the oscilloscope module 146.

Thus, during simulation of the model 100, the FFE module 136 and the DFE module 138 is appropriately tuned to compensate for both the pre-cursor and post cursor portions of pulses received by the receiver module 130. Once the tuning of the FFE module 136 and the DFE module 138 are complete, the settings of the FFE module 136 and the DFE module 138 is implemented in the FFE and/or the DFE of the actual communication channel that the model 100 represents.

FIG. 3 illustrates an example method 300 for tuning the FFE module 136 and the DFE module 138 of FIG. 1, in accordance with an embodiment of the present disclosure. Referring to FIGS. 1 and 3, in an embodiment, the method 300 includes, at 304, creating an FFE pulse response data base for one or more settings of the FFE module 136. The FFE module 136 includes a plurality of tunable or adjustable settings (e.g., tap weights, delays, variable strength of electronic components, etc.).

In an embodiment, the model 100 is initially simulated to tune the FFE module 136. During tuning the FFE module 136, the DFE module 138 is, for example, disabled and/or the output of the DFE module 138 is ignored. In another embodiment, a different model (e.g., different from model 100) is formed that includes the FFE module 136 (but not including the DFE module 138), and the FFE module of the different model is tuned initially. Referring again to FIG. 3, in an embodiment, the method 300 further includes, at 308, injecting a plurality of signals into a model of a communication channel, the model being configured to have the FFE module 136 at a receiving end of the model. For example, the PRBS generation module 110 generates and injects a plurality of pseudo-random binary sequence of data in the model 100. The operations at 308 further includes tuning (e.g., using the optimizer module 150) a setting of the FFE module 136 to obtain a first ratio of a pulse peak to a rise time in a precursor portion of the injected plurality signals that are received from the channel. In an embodiment, the first ratio of the pulse peak to the rise time is an optimal (e.g., maximum achievable) ratio of the pulse peak to the rise time in the precursor portion of the injected plurality signals, and/or corresponds to a maximum achievable slope of rising edge of the precursor portion of the injected plurality signals. The first ratio is chosen such that the precursor portions of the pulses in the injected plurality signals have a relatively low pulse rise time, i.e., a relatively better pre-cursor response of the output of the FFE module 136. In an embodiment, the tuning of the FFE module 136 at 308 is performed without taking into account the tuning and/or operation of the DFE module 138. Tuning a FFE module while simulating a channel model by injecting signals in the channel model is not elaborated upon in order to avoid obfuscating key teaching principles of this written description.

Improving the precursor response of the pulses by tuning the FFE module 136 (at 308) usually has an adverse effect on the post-cursor portion of the pulses (or at least cannot improve the post-cursor portion of the pulses). The DFE module 138 may be tuned to compensate or improve the post-cursor portion of the pulses. Accordingly, the method 300 further includes, at 312, injecting (e.g., using the PRBS generator module 110) another plurality of signals into the model (e.g., model 100) of the communication channel, the model reconfigured to have the tuned FFE module 136 (that was tuned at 308) and the DFE module 138 downstream of the tuned FFE module 136. The operations at 312 further comprise tuning (e.g., using the optimizer module 150) a setting of the DFE module 138 based on a post-cursor tail characteristic of another plurality of signals that was injected in the first part of 312. Thus, for the tuned settings of the FFE module 136 (chosen at 308 to obtain the first ratio), the DFE module 138 is tuned to facilitate compensating for the post-cursor effect (e.g., compensating for ISI) that wasn't sufficiently compensated for by the FFE module 136. Tuning a DFE while simulating a channel model by injecting signals in the channel model is also not elaborate upon to avoid obfuscating key teaching principles of this written description. In an embodiment, tuning the settings of the FFE module 136 and/or the DFE module 138 are performed in time domain.

In an embodiment, if the FFE module 136 is tuned relatively aggressively at 308 (e.g., tuned to have a very high pulse peak to pulse rise time ratio, or a strong pre-cursor response), this may affect the post-cursor portion of the pulses as well, which the DFE module 138 may then not be able to compensate sufficiently or fully. This may increase the BER of the output of the receiver module 130. Accordingly, the FFE module 136 and the DFE module 138 is tuned iteratively, until a satisfactory performance of the receiver module 130 (e.g., a relatively low BER, a relatively better opening in the eye diagram generated by the oscilloscope module 146, and/or the like) is achieved.

Accordingly, in an embodiment, the method 300 further includes, at 316, measuring an output of the model 100. For example, to measure the output of the model 100, the model is simulated by injecting (e.g., using the PRBS generator module 110) a plurality of signals into the model 100 having the tuned FFE module 136 and the tuned DFE module 138 (that were tuned at 308 and 312, respectively). In an embodiment, the output of the model is measured using the BER analyzer module 144 and/or the oscilloscope module 146. The output of the model 100 may be measured in terms of the BER of the model (e.g., using the BER analyzer module 144) and/or by generating an eye diagram of the output of the receiver module 130 using the oscilloscope module 146. One or more parameters associated with the generated eye diagram (e.g., an eye opening, the BER, post-cursor pulse response, and/or the like) may be measured using the oscilloscope module 146.

The method 300 further includes, at 320, determining if the output of the receive module 130 is satisfactory (e.g., if the tuning of the FFE module 136 and the DFE module 138 is satisfactory). In an embodiment, the determination is performed by, for example, comparing the measured BER (measured at 316) with a threshold BER. In another embodiment, the eye opening of the generated eye diagram (generated at 316) is checked to determine if the eye opening is at least greater than a threshold eye opening. In another embodiment, the pre-cursor and/or the post-cursor pulse response is studied in the generated eye diagram to determine if both the precursor and post-cursor ISI is compensated for such that the eye is sufficiently open. Alternatively (or additionally), the post-cursor pulse response is studied in the generated eye diagram to determine if the post-cursor pulse response is satisfactory, the DFE module 138's tap values is compared to the post-cursor pulse response to determine if the DFE module 138's tap values are able to satisfactorily compensate post-cursor ISI effects of the pulses received by the DFE module 138, and/or the like.

If at 320 the output of the receiver module is not satisfactory (e.g., if the measured BER is greater than the threshold BER), at 324, the settings of the FFE module 136 are modified, for example the FFE module 136 is re-tuned such that the FFE module 136 has a relatively weaker pre-cursor response (e.g., having relatively lower pulse peak to pulse rise time ratio) compared to the previous pre-cursor response (chosen at 308). The re-tuning of the FFE module 136 is performed by injecting signals in the model 100, at least in part similar to the tuning operation at 306. Re-tuning the FFE module 136 (with a relatively weaker pre-cursor response, i.e., with a relatively lower ratio of the pulse peak to the rise time) helps or facilitates the DFE module 138 to better compensate for the post-cursor effects of the pulses. That is, in accordance with an embodiment, the FFE module 136 is iteratively re-tuned such that the pre-cursor response is made progressively weaker (e.g., progressively lower ratio of the pulse peak to the rise time), until the DFE module 138 is able to sufficiently compensate the post-cursor effects of the received pulses (e.g., until the DFE module 138 is able to satisfactorily compensate ISI effect of the pulses received by the DFE module 138).

During each iteration cycle, at 324, the FFE is re-tuned such that the ratio of the pulse peak to the rise time during any given iteration cycle is less than a ratio of the pulse peak to the rise time of the immediate previous iteration cycle. In various embodiments, re-tuning the FFE setting with such a lower ratio (e.g., compared to the previous iteration) at 324 improves the post-cursor compensation of the pulses compared to the previous iteration cycle(s).

In an embodiment, the operations at 312, 316, 320 and 324 are iteratively repeated until the output of the receiver module 130 is found to be satisfactory (Yes at 136).

Subsequent to achieving satisfactorily performance at 320, in an embodiment, the method 300 further includes, at 328, verifying the pulse shape of the output of the receiver module 130 using, for example, the oscilloscope module 146.

In an embodiment, the method 300 further includes, at 332, tuning the DFE and FFE of the actual communication channel using final settings of the DFE module 138 and FFE module 136, respectively, of the model 100. That is, the settings (e.g., tap weights, delays, strengths of electronic components etc.) of the FFE and DFE of the actual communication channel is set to be substantially equal to the finally tuned settings of the FFE module 136 and DFE module 138.

Although tuning of the FFE and DFE of the actual communication channel has been so far described with respect to tuning the FFE module 136 and DFE module 138 of the model 100, in an embodiment, the FFE and DFE of the actual communication channel may be directly tuned (e.g., without tuning the respective modules in a model of the communication channel). For example, the actual communication channel may include and/or may be coupled to a oscilloscope (similar to the oscilloscope module 146), and the FFE and the DFE of the actual communication channel may be directly tuned using a reading of the oscilloscope through a method that may be at least in part similar to the method 300 of FIG. 3, as will be readily understood by those skilled in the art based at least in part on the teachings provided herein.

Figure 4:
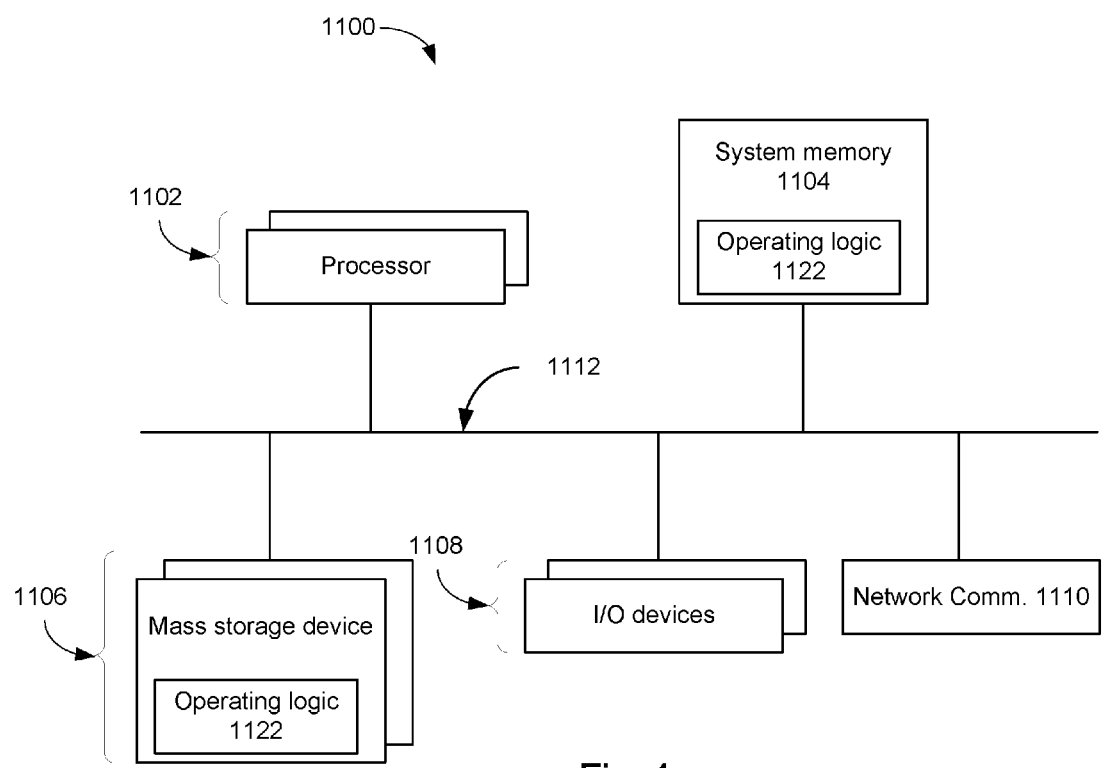
FIG. 4 schematically illustrates a simplified block diagram of a system in which embodiments of the present disclosure may be implemented.

FIG. 4 schematically illustrates a simplified block diagram of a system 1100 in which embodiments of the present disclosure may be implemented. As illustrated, system 1100 includes one or more processors or processor cores 1102, and system memory 1104. For the purpose of this application, including the claims, the terms "processor" and "processor cores" may be considered synonymous, unless the context clearly requires otherwise. Additionally, system 1100 includes mass storage devices 906 (such as diskette, hard drive, compact disc read only memory (CDROM) and so forth), input/output devices 1108 (such as a display to render visual manifestation, a keyboard, a cursor control, and so forth) and communication interfaces 1110 (such as network interface cards, modems and so forth). The elements of FIG. 4 may be operatively coupled to each other via system bus 1112, which represents one or more buses. In the case of multiple buses, they may be bridged by one or more bus bridges (not illustrated).

Each of these elements performs typical functions. For example, system memory 1104 and mass storage 1106 may be employed to store a working copy and a permanent copy of the programming instructions implementing all or a portion of earlier described functions, herein collectively denoted as 1122. The instructions 1122 may be assembler instructions supported by processor(s) 1102 or instructions that can be compiled from high level languages, such as C.

The permanent copy of the programming instructions may be placed into permanent storage 1106 in the factory, or in the field, through, for example, a distribution medium (not shown), such as a compact disc (CD), or through communication interface 1110 (from a distribution server (not shown)). That is, one or more distribution media having instructions 1122 may be employed to distribute the instructions 1122 and program various computing devices.

In an embodiment, the processor(s) 1102 are configured to facilitate generating and/or simulating the model 100, tuning the FFE module 136 and/or the DFE module 138 of FIG. 1, as discussed above with respect to method 300 of FIG. 3.

In embodiments of the present disclosure, a machine-readable medium having associated instructions, which, when executed, instructs a machine implement one or more methods as disclosed herein. For example, in example embodiments, a machine-readable medium comprises a storage medium and a plurality of programming instructions stored in the storage medium and adapted to program the machine to formulate and simulate a model (e.g., model 100 of FIG. 1) of a communication channel, and to perform one or more operations illustrated in FIG. 3.

Although specific embodiments have been illustrated and described herein, based on the foregoing discussion it is appreciated by those of ordinary skill in the art and others, that a wide variety of alternate and/or equivalent implementations may be substituted for the specific embodiment illustrated and described without departing from the scope of the present disclosure. This present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. This application is intended to cover any adaptations or variations of the embodiment discussed herein. Therefore, it is manifested and intended that the disclosure be limited only by the claims and the equivalents thereof.

What is claimed is:

1. A method for tuning an analog equalizer and a digital equalizer, comprising:
    injecting a plurality of signals into a model of a communication channel, the model being configured to have an analog equalizer at a receiving end;
    tuning a setting of the analog equalizer to obtain a first ratio of a pulse peak to a rise time in a precursor portion of the injected plurality signals that are received from the channel;
    injecting another plurality of signals into the model of the communication channel, the model being reconfigured to have the tuned analog equalizer and a digital equalizer downstream of the tuned analog equalizer;
    tuning a setting of the digital equalizer based on a post-cursor tail characteristic of the another plurality of signals;
    injecting a further another plurality of signals into the model having the tuned analog equalizer and the tuned digital equalizer;
    measuring a bit error rate (BER) of the model based at least in part on injecting the further another plurality of signals;
    determining that the measured BER is less than a threshold BER value; and
    iteratively repeating said injecting a plurality of signals, said subsequent tuning of the setting of the analog equalizer, said injecting another plurality of signals, said subsequent tuning of the setting of the digital equalizer, said injecting a further another plurality of signals, and said subsequent measurement of the BER, until the measured BER of the model is less than the threshold value, wherein a ratio of the pulse peak to the rise time during each iteration is less than a ratio of the pulse peak to the rise time of the immediate previous iteration.

2. The method of claim 1, wherein tuning a setting of the analog equalizer comprises tuning the first ratio of the pulse peak to the rise time to an optimal ratio of the pulse peak to the rise time in the precursor portion of the injected plurality signals that are received from the channel.

3. The method of claim 1, wherein tuning a setting of the analog equalizer comprises tuning the first ratio of the pulse peak to the rise time to a maximum achievable ratio of the pulse peak to the rise time in the precursor portion of the injected plurality signals that are received from the channel.

4. The method of claim 1, wherein tuning a setting of the analog equalizer comprises tuning the first ratio of the pulse peak to the rise time to a maximum achievable slope of rising edge of the precursor portion of the injected plurality signals that are received from the channel.

5. The method of claim 1, further comprising:
   determining a final setting of the analog equalizer and the digital equalizer of the model at the end of said iteratively repeating; and
   tuning an analog equalizer and a digital equalizer of the communication channel using the final settings.

6. The method of claim 1, wherein said tuning the settings of the analog equalizer and said tuning the settings of the digital equalizer are performed in time domain.

7. The method of claim 1, wherein the analog filter is a feed forward equalizer and the digital filter is a decision feedback equalizer.

8. A system comprising a model representative of a communication channel, the model comprising:
   a driver module configured to receive a pseudo-random binary sequence of data during a simulation of the model;
   an interconnect module configured to transmit the received pseudo-random binary sequence of data to a receiver module during the simulation;
   the receiver module including an analog equalizer module, a digital equalizer module, and an optimizer module configured to tune the analog equalizer module and the digital equalizer module;
   a bit error rate (BER) analyzer module operatively coupled to the receiver module and configured to determine a BER of the model;
   wherein the PRBS generator module is further configured to inject a further another pseudo-random binary sequence of data into the model having the tuned analog equalizer and the tuned digital equalizer;
   wherein the BER analyzer module is further configured to measure a BER of the model based at least in part on injecting the further another pseudo-random binary sequence of data;
   wherein the BER analyzer module is further configured to determine whether the measured BER is less than a threshold BER value; and
   wherein one or more components of the system is configured to iteratively repeat injecting a plurality of pseudo-random binary sequence of data, subsequent tuning of the setting of the analog equalizer, injecting another pseudo-random binary sequence of data, subsequent tuning of the setting of the digital equalizer, injecting a further another pseudo-random binary sequence of data, and subsequent measurement of the BER, until the measured BER of the model is less than the threshold value, wherein a ratio of the pulse peak to the rise time during each iteration is less than a ratio of the pulse peak to the rise time of the immediate previous iteration.

9. The system of claim 8, further comprising:
   a pseudorandom binary sequence (PRBS) generator module configured to generate and inject a pseudo-random binary sequence of data into the driver module;
   wherein the optimizer module is configured to tune a setting of the analog equalizer module to obtain a first ratio of a pulse peak to a rise time in a precursor portion of the pseudo-random binary sequence of data that are received from the channel;
   wherein the PRBS generator module is further configured to inject another pseudo-random binary sequence of data into the model subsequent to the optimizer module tuning a setting of the analog equalizer module; and
   wherein the optimizer module is further configured to tune a setting of the digital equalizer module based on a post-cursor tail characteristic of the another pseudo-random binary sequence of data.

10. The system of claim 8, wherein the optimizer module is configured to tune a setting of the analog equalizer such that the first ratio of the pulse peak to the rise time corresponds to a maximum achievable slope of rising edge of the precursor portion of the injected plurality signals that are received from the channel.

11. The system of claim 8, wherein the system is configured to determine a final setting of the analog equalizer and the digital equalizer of the model at the end of the iteratively repeating, and to export the final setting for tuning an analog equalizer and a digital equalizer of the communication channel.

12. The system of claim 8, wherein the analog filter is a feed forward equalizer and the digital filter is a decision feedback equalizer.

13. A non-transitory machine-readable medium having associated instructions, which, when executed, instructs a machine to:
   inject a plurality of signals into a model of a communication channel, the model being configured to have a feed forward equalizer (FFE) module at a receiving end;
   tune a setting of the FFE module to obtain a first ratio of a pulse peak to a rise time in a precursor portion of the injected plurality signals that are received from the channel;
   inject another plurality of signals into the model of the communication channel, the model being reconfigured to have the tuned FFE module and a decision feedback equalizer (DFE) module downstream of the tuned FFE module;
   tune a setting of the DFE module based on a post-cursor tail characteristic of the another plurality of signals;
   inject a further another plurality of signals into the model having the tuned FFE module and the tuned DFE module;
   measure a bit error rate (BER) of the model based at least in part on injecting the further another plurality of signals;
   determine that the measured BER is less than a threshold BER value; and
   iteratively repeat said injecting a plurality of signals, said subsequent tuning of the setting of the FFE module, said injecting another plurality of signals, said subsequent tuning of the setting of the DFE module, said injecting a further another plurality of signals, and said subsequent measurement of the BER, until the measured BER of the model is less than the threshold value, wherein a ratio of the pulse peak to the rise time during each iteration is less than a ratio of the pulse peak to the rise time of the immediate previous iteration.

14. The non-transitory machine-readable medium of claim 13, wherein the associated instructions, when executed, further instruct the machine to:
   determine a final setting of the FFE module and a final setting of the DFE module of the model at the end of said iteratively repeating; and
   tune a FFE and a DFE of the communication channel using the final settings.

* * * * *